April 30, 1935. J. M. LINDENMUTH ET AL 1,999,816
METHOD OF THREADING STUDS
Filed July 12, 1933

Inventors
J. M. Lindenmuth,
and J. E. Weirich.
By R. S. C. Dougherty.
Attorney

Patented Apr. 30, 1935

1,999,816

UNITED STATES PATENT OFFICE 1,999,816

METHOD OF THREADING STUDS

John M. Lindenmuth and James E. Weirich, Lebanon, Pa., assignors to Bethlehem Steel Company, a corporation of Pennsylvania Application July 12, 1933, Serial No. 680,056

12 Claims. (Cl. 10—1)

This invention relates to an improved method of manufacturing heat treated studs and particularly to the method of threading the studs.

Heretofore, studs of this nature were made by heat treating long lengths of bar stock and threading the bar its full length except for the material at one end for gripping purposes, then cutting the threaded bar to the desired stud lengths in a lathe. By this method the bar stock is heat treated in bundles which causes much warping of the stock which must subsequently be straightened. It has been found difficult to straighten heat treated bars so that correct threads can be produced, and it has also been found that heat treating in bundles and the straightening operation often produces extremely hard spots on the stock due to ununiform treatment and to physical changes in the material resulting from the straightening operation. These hard spots cause excessive wear on the threading tools, also excessive heating to the extent that the threading operation must be interrupted at times to allow the dies to cool. This frequently causes imperfection in the threads with resulting rejections. Furthermore, the handling of long bars after threading and the repeated handling of the cut off sections often causes bruised or damaged threads which will not pass inspection until corrected. Taking this method as a whole, the manufacturing costs, rejection losses and loss in material at the ends of the bars are high.

In accordance with our improved method of manufacturing studs, we take a hot rolled bar and straighten it when cold if necessary. The bar is then cut and pointed to the desired stud lengths. These blank studs are then heat treated in any suitable manner and then threaded their full length with a continuous thread. The threading operation is one of the important features in the manufacture of the stud and comprises placing a blank in a grip chuck and threading it to the maximum length possible, after which the threaded end is placed in a specially prepared threaded grip on another machine that is perfectly aligned with its die-head and the chasers are closed over the threaded portion and the threading completed. This particular die-head is fitted with opposite hand chasers to that of the first machine but with right hand threads and arranged to rotate opposite to that of the first machine. The finishing of the thread is similar to backing a nut off a stud, thus completing the thread which is continuous from end to end and without waste of material.

One of the objects is to provide a method of manufacturing heat treated studs, whereby better physical properties are obtained in heat treating the short pieces than is possible in batch treatment of long bars.

Another object is to eliminate the straightening of long heat treated bars and to eliminate rejections caused by bruised or imperfect threads.

The novel and principal object of this invention is to provide a method for threading the short blanks so as to form a continuous and uninterrupted thread from end to end of the blank without waste and to produce threads of uniform pitch and depth.

The novel features will be more fully understood from the following description and claims taken with the drawing, in which:

Figure 1:
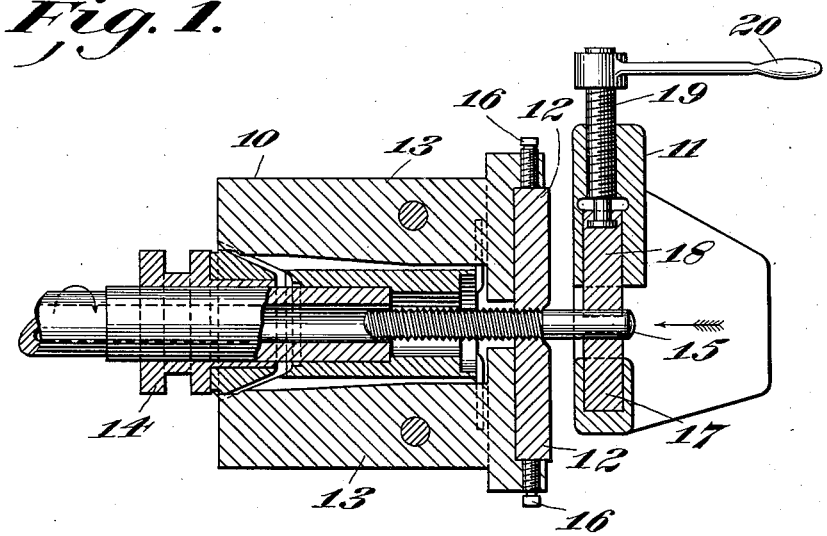
Figure 1 is a horizontal sectional view through the die-head and chuck of a threading machine and illustrates the first step in the threading operation.

Referring to Fig. 1 of the drawing, 10 indicates as a whole the threading tool or die-head of a "National" threading machine. 11 indicates the chuck for gripping and holding the work in alignment with the head. 12 are the thread chasers mounted in the pivotally supported tool holding members 13. The members 13 are adapted to be closed by the action of the cone-faced clutch 14 when pressed into engagement with the rear ends of members 13. Members 13 are arranged to open automatically when the clutch 14 is withdrawn so as to release the chasers from the stud 15 to allow its removal from the die-head. 16 are adjusting screws for the chasers. 17 indicates a fixed grip and 18 indicates a movable grip for chucking the work. 19 is the screw for actuating grip 18. 20 is the lever for rotating the screw to open or close the chuck. Since all of these parts and their functions are common to various types of machines, further description is believed unnecessary for an understanding to those skilled in the art.

Figure 2:
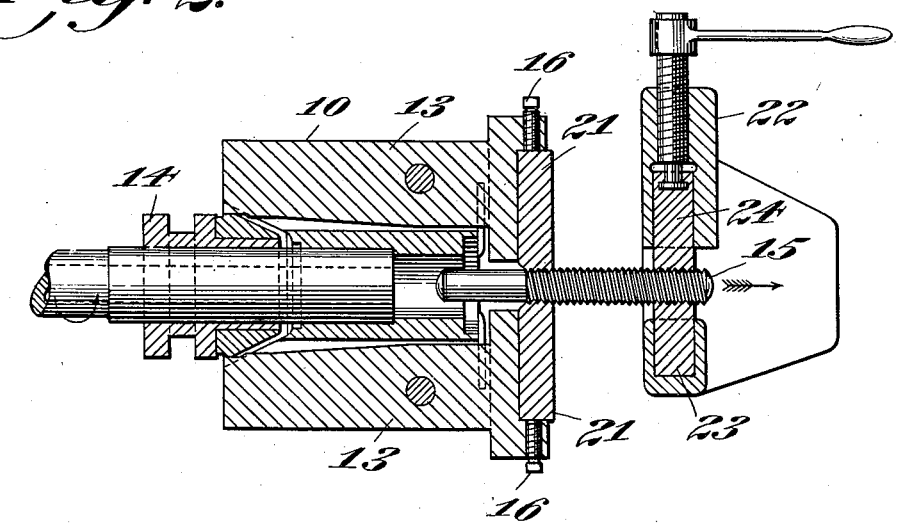
Fig. 2 is a horizontal sectional view through the die-head and chuck of another threading machine and illustrates the second or finishing step in the threading operation.

Fig. 2 illustrates the die-head of another threading machine, which is similar in mechanical features to the die-head as shown in Fig. 1. The only difference between the two heads resides in the chasers 21 being mounted in reversed relation to the chasers 12 of Fig. 1. Both sets of chasers are provided with right hand threads of equal characteristics. The chuck 22 of this machine is fitted with threaded grips 23 and 24 so as to engage the threaded end of the partly finished stud. The other features of the chuck being similar to those of Fig. 1.

In operation, one end of a blank stud is mounted in the grips 17 and 18 which align the blank with the axis of the die-head 10. The chuck 11 is then advanced toward the closed rotating chasers 12 which thread the stud over a major portion of its length. After the stud is threaded to the maximum length the die-head is arranged so as to automatically open and the partly threaded stud is withdrawn from the head and removed from the chuck. Thus far the threading is similar to an ordinary method of threading one end of a bolt or the like. The next and novel step comprises reversing the stud and placing its threaded end in the threaded grips of chuck 22 and entering the unthreaded end of the stud into the opened chasers 21, after which the chasers are closed upon the threads as shown in Fig. 2 so as to register therewith. The die-head of this machine is then rotated in a direction opposite to that of the first machine and the stud is drawn outwardly through the chasers to complete the threading of the stud. It will be noted that the movement of the chuck in Fig. 2 is opposite to that in Fig. 1 during the threading operation as indicated by the arrows. By threading a stud after this manner we obtain a continuous and uninterrupted thread of uniform depth and pitch from end to end and without any waste as in the case where a long rod is ordinarily threaded as far as the chuck will permit and then having to discard the chucked or unthreaded end portion. It is obvious that by this method of threading there is no overlapping of threads such as produced when a stud is threaded from both ends on the same machine, due to the fact that the finishing of the thread starts where the unfinished thread stops, thus obtaining a continuity of the thread and in the same direction in which the thread was originally started.

By registering the chasers with the previously threaded portion of the stud, a lead is definitely obtained for the unthreaded end whereby the stud will be automatically ejected or pushed out of the die-head without the assisting action of the lead screw which normally causes the chuck to move away from the die-head. It will thus be seen that the pitch or lead of the thread is not entirely dependent upon the lead screw to pull the work through the chasers because the previously threaded portion of the stud establishes a fixed lead for the unthreaded portion. However, it is believed advisable to use the lead screw for moving the chuck as it tends to reduce wear on the chasers.

Having thus devised a method for threading studs from end to end with a continuous thread, we are enabled to eliminate the difficulties encountered in having to straighten long rods after they have been heat treated, because by this method we straighten the rod, if necessary, before it is heat treated and then treat the short pieces which require no straightening.

In addition to the savings of this new method over the present common method a more accurately formed thread is produced with closer lead and pitch tolerances due to a more uniform temperature in threading as compared with continuous threading of long bars and with resulting longer life to the chasers. The marring of the threads in gripping is also eliminated by this new method, which previously caused considerable trouble in nutting as well as heavier inspection costs.

The drawing shows the distinctive features of threading studs with a "National" die-head, however, this same method can be arranged with a "Landis" or any other standard make die-head to obtain the same results.

While we have illustrated and described our invention with the stud being held in a slidingly mounted chuck which advances or withdraws the stud relative to the rotating chasers, it is quite obvious that the work may be rotated in a non-slidable chuck and the chasers mounted in a slidable tool holder. In other words, it matters not which is the rotatable or slidable member, and it will be understood that in its broader aspects, the invention is not limited to the specific means shown covering the various movements and actions described, producing the results stated.

Having described our invention, what we claim as new and desire to secure by Letters Patent, is:

1. A method of completely threading a partly threaded stud or the like, comprising gripping the threaded end of the stud in a chuck so as not to injure the threads and inserting the unthreaded end into an opened die-head of a threading machine, closing the dies of said head upon a portion of the previously formed threads so as to register therewith, rotating said head and moving the stud through said dies so as to completely thread the stud.

2. A method of cutting continuous screw threads on a stud or the like, comprising first partly threading the stud from one end, then gripping the threaded end of the stud and inserting the unthreaded end into an opened die-head of a threading machine, registering the dies of said head with the previously formed threads, rotating said head and withdrawing the stud from the head so as to complete the thread.

3. A method of completely threading a partly threaded stud or the like, comprising gripping the threaded end of the stud in a chuck, inserting the unthreaded end into an opened die-head of a threading machine, closing the dies of said head upon a threaded portion of the stud so as to establish a lead for threading the unfinished portion, and rotating said head to move the stud automatically through the head by the action of said lead, whereby to produce a continuity of the thread from end to end.

4. A method of cutting continuous screw threads on a stud, comprising first partly threading the stud from one end in a threading machine having a rotatable die-head by feeding the stud into the dies, then removing the stud from this machine and finish threading the same by inserting the unthreaded end of the stud into the rotatable die-head of another threading machine and drawing the stud through the dies to complete the thread.

5. A method of cutting continuous screw threads, comprising feeding the piece to be threaded into a rotating threading tool to partly thread the piece, transferring the partly threaded piece to another threading tool and inserting the unthreaded portion of the piece into said tool, registering said second tool with the previously formed threads, rotating said tool and simultaneously withdrawing the piece so as to completely thread the same throughout its entire length.

6. A method of cutting continuous screw threads, comprising feeding the piece to be threaded into a rotating threading tool to partly thread the piece, transferring the partly threaded piece to another threading tool fitted with a cutter of opposite hand to the first machine, reversing the piece and registering said cutter with the previously formed threads, rotating said tool in a direction opposite to that of the first machine and simultaneously causing relative movement between said tool and the unthreaded end of the piece so as to uniformly thread the piece from end to end in a continuous manner.

7. A method of cutting continuous screw threads on a stud, comprising mounting a blank stud in a chuck of a threading machine, feeding the stud into a rotating die-head provided with chasers to thread the stud over a portion of its length, removing the partly threaded stud from the machine and mounting its threaded end in a chuck of a similar machine, registering the chasers of this machine with a threaded portion of the stud, and finish threading the stud so as to form a continuous thread of uniform depth and pitch from end to end.

8. A method of cutting continuous screw threads on a stud, comprising mounting a blank stud in a chuck of a threading machine, feeding the stud into a rotating die-head provided with chasers to partly thread the stud, removing the partly threaded stud from the machine, reversing the stud and mounting its threaded end in a chuck of another similar threading machine, inserting the stud into the die-head and registering the chasers of this machine with a threaded portion of the stud, rotating the die-head in a counter direction to that of the first machine, and feeding the stud away from the die-head to complete the threading operation.

9. A method of cutting continuous threads on a stud, comprising mounting the stud in a chuck member of a threading machine, mounting thread chasers in a tool holding member of said machine, rotating one of said members and simultaneously feeding the other member toward the rotating member to thread one end of the stud, transferring the stud to another threading machine having a tool holding member fitted with thread chasers of opposite hand to those of the first machine, mounting the threaded end of the stud in the chuck member of the machine, closing the chasers on the previously cut threads of the stud, rotating one of said members in a direction opposite to that of the first machine and simultaneously withdrawing the other member to completely thread the stud in a continuous and uniform manner.

10. A method of cutting continuous right-hand threads the full length of a stud without waste, comprising threading in one machine the greater portion of the stud after the common manner of threading a bolt, then reversing the stud and gripping its threaded end in a threaded grip of another threading machine which is specially fitted with opposite hand chasers but with right-hand threads, placing the partly threaded stud between the chasers and closing the chasers over the threaded portion of the stud, rotating the chasers in a direction opposite to that of the first machine and simultaneously drawing the unthreaded end of the stud through the chasers so as to cut threads on the unfinished end of the stud in a continuous manner and of uniform depth.

11. A method of cutting continuous screw threads the full length of a stud without waste, comprising gripping a blank stud in a chuck of a threading machine having an opening and closing die-head and provided with chasers, closing the die-head and rotating same in a clockwise direction, feeding the stud into the chasers to thread the stud over a portion of its length, removing the partly threaded stud from the machine, reversing the stud and gripping its threaded end in a threaded chuck of another threading machine having a die-head similar to the first machine but fitted with reverse hand chasers, opening the die-head and inserting the unthreaded end into same to the extent that the blank end of the stud will be to the rear of the chasers, closing the chasers on a threaded portion of the stud, rotating the die-head counter-clockwise, and simultaneously moving the stud through the die-head so as to continue the cutting of the threads formed by the first machine in an uninterrupted manner.

12. A method of cutting continuous screw threads the full length of a stud without waste, comprising gripping a blank stud in a chuck of a threading machine having an opening and closing die-head and provided with chasers, feeding the stud into a closed die-head and simultaneously rotating same in a clockwise direction to thread the stud over a portion of its length, removing the partly threaded stud from the machine, reversing the stud and gripping its threaded end in a threaded chuck of another threading machine having a die-head similar to the first machine but fitted with reverse chasers, inserting the unthreaded portion of the stud into the open head, closing the chasers on a threaded portion of the stud, rotating the die-head counter-clockwise, and simultaneously feeding the stud away from the die-head so as to form a continuous and uninterrupted thread from end to end on the stud.

JOHN M. LINDENMUTH.
JAMES E. WEIRICH.